(12) United States Patent
Knowles et al.

(10) Patent No.: US 11,808,616 B1
(45) Date of Patent: Nov. 7, 2023

(54) ACOUSTIC ARRAY LIQUID LEVEL SENSOR

(71) Applicant: Texzec, Inc., Round Rock, TX (US)

(72) Inventors: Terence John Knowles, Austin, TX (US); Charles F Bremigan, III, Jarrell, TX (US)

(73) Assignee: Texzec, Inc., Round Rock, TX (US)

( * ) Notice: Subject to any disclaimer, the term of this patent is extended or adjusted under 35 U.S.C. 154(b) by 0 days.

(21) Appl. No.: 18/301,166

(22) Filed: Apr. 14, 2023

(51) Int. Cl.
*G01F 23/2962* (2022.01)
*G01F 23/296* (2022.01)

(52) U.S. Cl.
CPC ...... *G01F 23/2962* (2013.01); *G01F 23/2968* (2013.01)

(58) Field of Classification Search
CPC .......................... G01F 23/2962; G01F 23/2968
See application file for complete search history.

(56) References Cited

U.S. PATENT DOCUMENTS

| | | | |
|---|---|---|---|
| 4,545,245 A * | 10/1985 | Sharp | G01F 23/296 73/290 V |
| 5,329,070 A | 7/1994 | Knowles | |
| 8,919,193 B2 | 12/2014 | Knowles | |
| 9,880,044 B2 | 6/2018 | Knowles | |
| 10,551,238 B2 | 2/2020 | Knowles | |
| 11,320,938 B1 | 5/2022 | Knowles | |
| 2009/0312965 A1 | 12/2009 | Knowles | |
| 2013/0091946 A1 | 4/2013 | Knowles | |

* cited by examiner

*Primary Examiner* — Kristina M Deherrera
*Assistant Examiner* — Jean F Morello
(74) *Attorney, Agent, or Firm* — Patents and Licensing LLC; Daniel W Juffernbruch

(57) ABSTRACT

An ultrasonic sensor detects a liquid level. A substrate (707) has an acoustic array (705). An acoustic diversion array (710) can be between a substrate edge (713) and the acoustic array. A sensing region (701) can lay next to the acoustic array opposite the acoustic diversion array. A collimation groove (706) can be in the substrate along a length of the acoustic array next to the liquid level sensing region. Multiple longitudinal folds (801, 802, 803) can run parallel to and between acoustic source and receive arrays. A feed strip (1201, 1202, 1309, 1311) can be used with a bend (1203, 1204) acoustically coupled to the acoustic array and an ultrasonic transducer at another end of the feed strip. The feed strip runs along the entire acoustic array when top fed and runs along part of the acoustic array when fed through a side of a tank (1401).

30 Claims, 14 Drawing Sheets

ACOUSTIC ARRAY LIQUID LEVEL SENSOR

BACKGROUND OF THE INVENTIONS

1. Technical Field

The present inventions relate to acoustic sensors and, more particularly, relate to a sensor array for acoustically sensing a liquid level.

2. Description of the Related Art

The acoustic array liquid level sensor disclosed in U.S. Pat. No. 9,880,044 by Knowles has limitations in practice. A first limitation is the need for dampening strips described in U.S. Pat. No. 9,880,044 to suppress multiple reflections. Dampening strips can contaminate the liquid and the other methods require costly machining of the edges of the sensor substrate. A second limitation is wave diffraction—that is wavefront spreading from the acoustic transducers and arrays. This creates artifacts which cause problems in determining liquid level. A third limitation is that the sensor substrate may be too wide to mount in some liquid holding tanks.

FIG. 1 illustrates a plan diagram of the double array liquid level sensor of the disclosed in prior art U.S. Pat. No. 9,880,044. FIG. 1 illustrates multiple reflections of sensing waves. These liquid level sensors require elimination of multiple reflections of sensing waves due to reflection from the edges of the sensor substrate. As shown in FIG. 1, for the desired path, sensing waves 101 are generated at the source array 102 by primary source wave conversion. The source waves themselves are generated by transducer 108. They then travel at right angles to the source array axis and convert back to secondary source waves at the receive array 103 and continue to receive transducer 109.

The sensing waves 101 pass through the receive array 103, reflect from its adjacent substrate edge 104, pass back across the receive array 103 then through the source array 102 to reflect from its adjacent edge 106 to begin a second pass. Because the multiple sending waves lose such a small amount of energy per pass, there can be multiple passes each taking the time it takes to traverse the width twice 107.

At the liquid interface, as the source waves in the source array travel from above to below the liquid, the desired signal amplitude changes from high to low to indicate presence of liquid because sensing waves are absorbed by the liquid. The problem is that the sensing waves above the liquid undergo multiple reflections from edge to edge of the substrate 107. That is the "echoes" reverberate for a long enough time to add substantial spurious components in the response transition region that should indicate a low amplitude. These spurious components are indistinguishable from the desired response and cause the high/low transition to be very difficult to determine.

These so called multiple waves were reduced to acceptable amplitudes in U.S. Pat. No. 9,880,044 Knowles by adding acoustic damping strips. These acoustic damping strips were polymer strips parallel to the array axis and adjacent to the edges of the substrate. However, the acoustic damping strips restricted use of these liquid level sensors to liquids that do not dissolve or chemically attack the strips or can tolerate potential contamination due to the polymer. Instead of acoustic damping strips to reduce multiple reflections, as described in the U.S. Pat. No. 9,880,044 patent, machining the sensor substrate edges was an alternative. However machining the sensor substrate edges added significant cost to the manufacturing process.

The improvements of the present invention address these and other enhancements to the use of acoustic array liquid level sensors.

SUMMARY OF THE INVENTIONS

An object of the present inventions is to sense a greater range of changes in liquid level with an acoustic array type of liquid level sensor.

A further object of the present inventions is an acoustic array liquid level sensors without the use of dampening strips.

Another further object of the present inventions is an acoustic array liquid level sensors capable of being mounted through the top, base or sides of a liquid holding tank.

Another object of the present invention is to decrease the width of the sensor.

BRIEF DESCRIPTION OF THE DRAWINGS

The present inventions are illustrated by way of example and are not limited by the accompanying figures, in which like references indicate similar elements. Elements in the figures are illustrated for simplicity and clarity and have not necessarily been drawn to scale.

The details of the preferred embodiments and these and other objects and features of the inventions will be more readily understood from the following detailed description when read in conjunction with the accompanying drawings wherein.

DETAILED DESCRIPTION OF THE PREFERRED EMBODIMENTS

Figure 1:
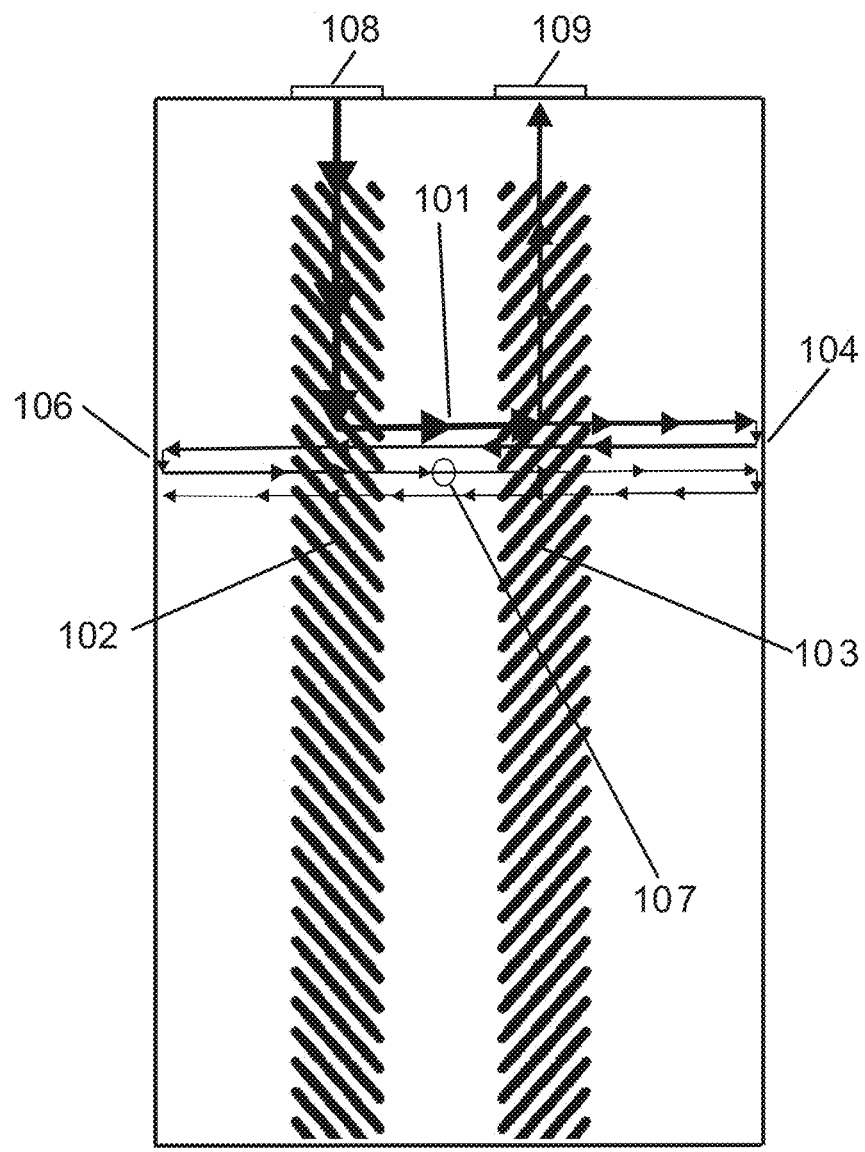
FIG. 1 illustrates a plan diagram of a double array liquid level sensor showing multiple reflections of sensing waves according to the prior art.
Figure 2:
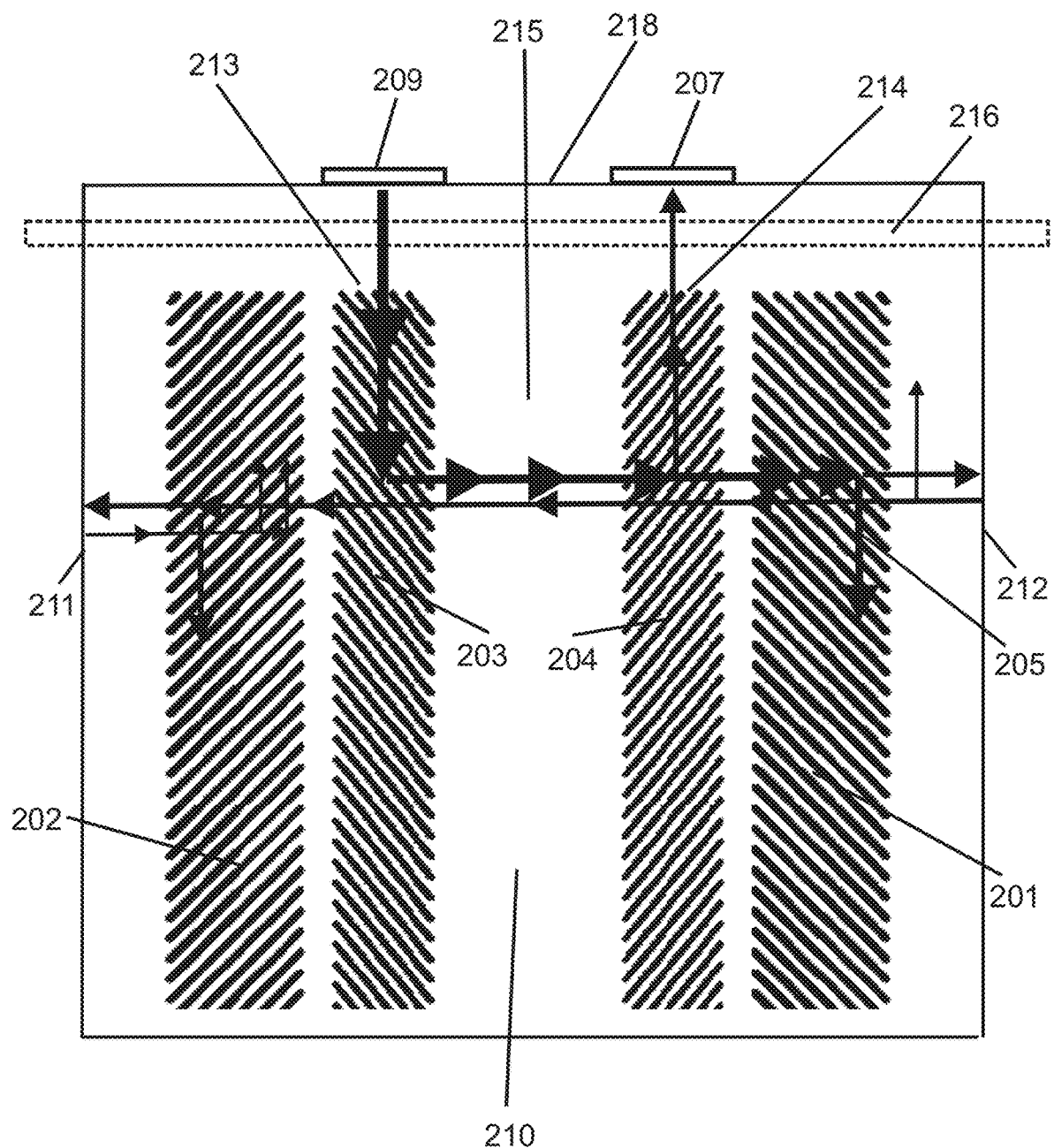
FIG. 2 illustrates a plan diagram of a double array liquid level sensor with diversion arrays showing the suppression of multiple reflections due to the addition of the diversion arrays according to embodiments of the present inventions.

FIG. 2 illustrates a plan diagram of a double array liquid level sensor with diversion arrays showing the suppression of multiple reflections due to the addition of the diversion arrays according to embodiments of the present inventions. A substrate 210 has a first edge 211 and a second edge 212. An acoustic source array 203 is formed on the substrate between the first edge 211 and the second edge 212. An ultrasonic send transducer 209 is acoustically coupled to and located at a top substrate edge 218 and aligned with the end of the acoustic array 213. An acoustic receive array 204 is formed on the substrate 210 between the acoustic source array 203 and the second edge 212. An ultrasonic receive transducer 207 is acoustically coupled to and located at the top substrate edge 218 and aligned with the end of the acoustic array 214. A liquid level sensing region 215 lies between the acoustic source array 203 and the acoustic receive array 204. The material for the substrate can be metal, plastic, or ceramic.

An acoustic diversion array 202 is formed on substrate between the first edge 211 and the source acoustic array 203 and runs in parallel with the acoustic array 203. Another acoustic diversion array 201 is formed on the substrate 210 next to a side of the acoustic receive array 204 opposite the acoustic source array 203. A liquid level sensing region 215 on the substrate lying next to the acoustic array 203 on a side of the acoustic array 203 opposite the acoustic diversion array 202.

The acoustic array 203, the sending array, has echelons set at an angle that converts the source wave to a sensing wave 215 and diverts it across the liquid level sensing region. The echelon angle is defined relative to the acoustic array axis. The echelons run in parallel at a set angle and spacing. The acoustic array 204, the receiving array, has echelons set at an angle to convert the sensing wave 215 back to a source wave and divert it to receive transducer 207.

In practice the substrate 210 is mounted from the top of the tank with the aid of a mounting plate 216 through which the substrate extends. The plate provides mechanical stability to the assembly and acts to seal the transducers from contact with the liquid and its vapors. The assembly is mounted such that the array axes are at right angles to the liquid surface.

The need for strips or edge machining may be eliminated by employing additional arrays that divert sensing waves from a transverse to a longitudinal direction as shown in FIG. 2 thereby eliminating multiple reflections from the edges. These diversion arrays 201 and 202 are placed between the source and receive arrays 203 and 204 respectively, and their adjacent edges, with 209 and 207 as the send and receive transducers respectively. The diversion arrays echelons are formed at about a 45 degree angle and act as reflectors, thereby diverting the sensing waves 205 from a transverse to a longitudinal direction. Typically, the sensing waves are diverted towards the liquid interface where they are absorbed. Diversion arrays have sufficient reflectivity to divert virtually all sensing wave energy away from the edges. They need not do this on a single pass because as shown in the figure, any non-diverted, first pass sensing waves will reflect off each edge for a second pass through each diversion array. Thus, the sensing waves must pass through the equivalent of four diversion arrays before they can create spurious components. In practice diversion arrays, which are formed in the same process as the source and receive arrays, are a practical and economical method of eliminating the problem of multiple reflections.

Figure 3:
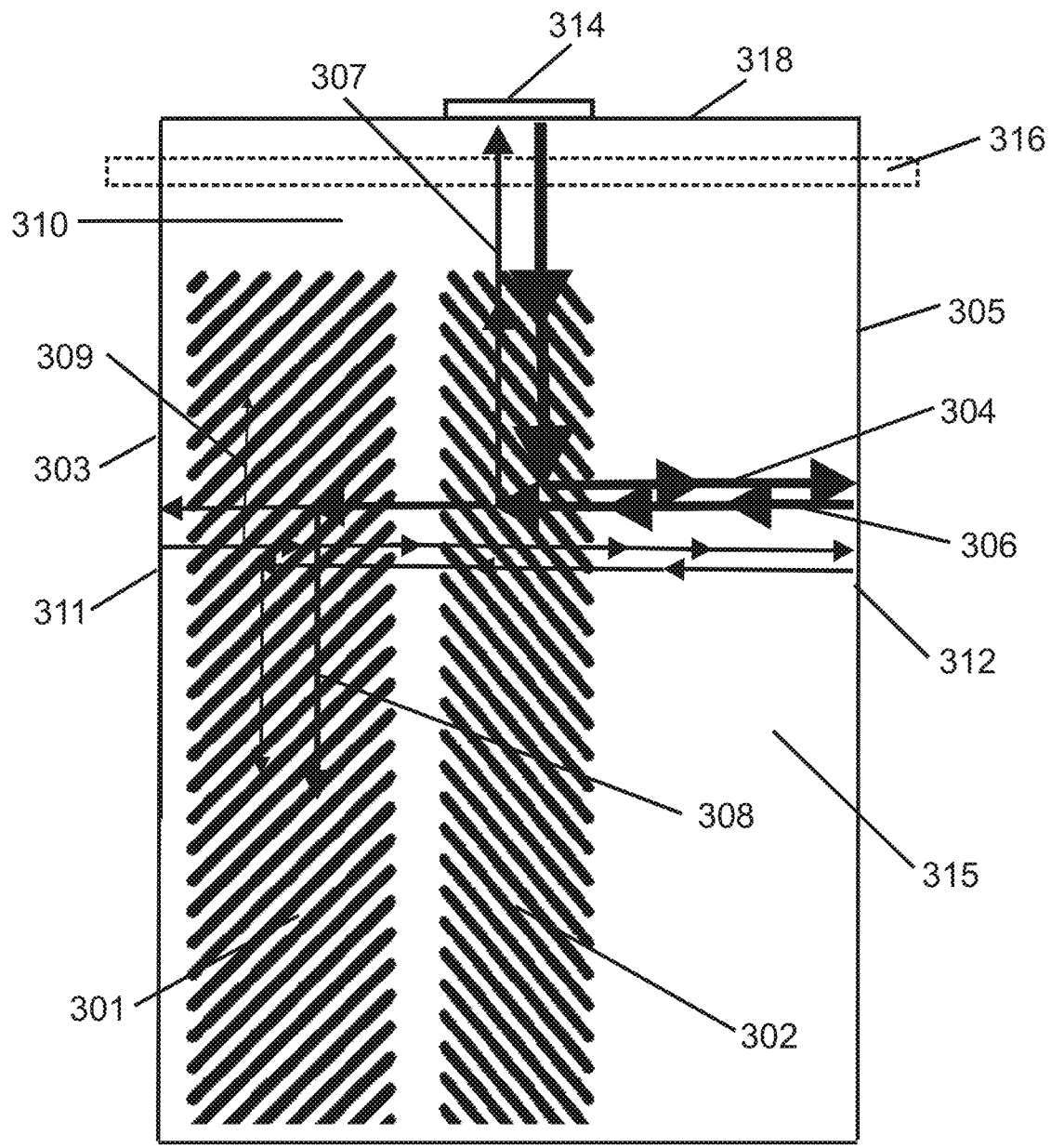
FIG. 3 illustrates a plan diagram of a single array liquid level sensor with a diversion array showing the suppression of multiple reflections due to the addition of the diversion array according to embodiments of the present inventions.

FIG. 3 illustrates a plan diagram of a single array liquid level sensor with a diversion array showing the suppression of multiple reflections due to the addition of the diversion array according to embodiments of the present inventions. A substrate 310 has a first edge 311 and a second edge 312. An acoustic send/receive array 302 is formed on the substrate between the first edge 311 and the second edge 312. An ultrasonic transducer 314 is acoustically coupled to a top edge 318 and aligned with the end of the send/receive array 307. A liquid level sensing region 315 lies between the acoustic array 302 and the second edge 312 of the substrate 310.

An acoustic diversion array 301 is formed on the substrate 310 between the first edge 311 and the acoustic array 302 and runs in parallel with the acoustic array 302. A liquid level sensing region 315 on the substrate lays next to the acoustic array 302 on a side of the acoustic array 302 opposite the acoustic diversion array 301.

Ultrasonic transducers such as the send transducer 209 and the receive transducer 207 can be located on the edge 218 of the substrate or located on a front or back surface of the substrate. The location of the ultrasonic transducers can be chosen such that ultrasonic waves are acoustically coupled between the transducer and the echelons of its associated array.

The echelons of the arrays and the diversion arrays such as 203, 302, 205, and 206 can be located on the same front surface of the substrate. Alternatively the echelons of the arrays and the diversion arrays can be located on the same back surface of the substrate or alternately on both the front and back surfaces of the substrate. The ultrasonic waves typically travel inside the substrate material and thus can be affected by arrays on either or both sides of a substrate. Nevertheless, because the echelons of the arrays can be formed on the substrates by etching or surface printing or deposition, it is typically more cost effective to place them on the same side of the substrate.

The acoustic array 302 has echelons angled to divert a portion of ultrasonic energy from the ultrasonic transducer across the liquid level sensing region. The echelon angle with respect to the array axis is set to convert source waves to sensing waves and divert them towards reflecting edge 305. As shown for the double array version of FIG. 2, the single array of FIG. 3 has a mounting plate 316 to provide an the same function as mounting plate 216 of FIG. 2.

FIG. 3 illustrates a single array liquid level sensor that includes a single diversion array for reducing the effects of multiple sensing wave reflections, A single diversion array 301 is deployed between the source/receive array 302 and a edge 303, with 314 as the send/receive transducer. The desired sensing wave path starts at the source/receive array as 304, reflects from edge 305 as 306, and returns to source/receive array to convert back to the source wave mode 307.

Figure 4:
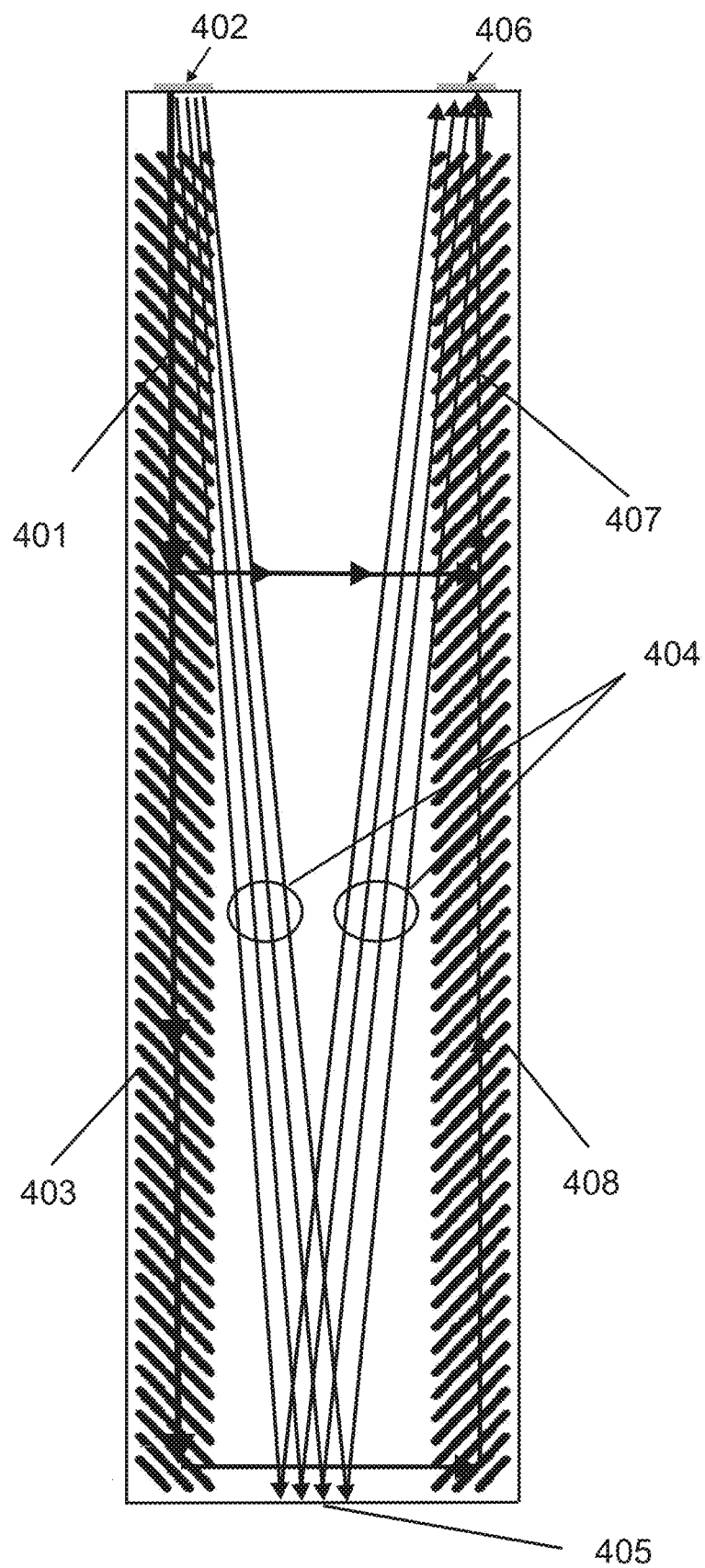
FIG. 4 illustrates a plan diagram of primary source wave diffraction in a double array liquid level sensor according to embodiments of the present inventions.

FIG. 4 illustrates a plan diagram of primary source wave diffraction in a double array liquid level sensor according to embodiments of the present inventions. It has been discovered that a majority of primary source wave energy 401 generated by send transducer 402 travels within and along the source array 403, however some of the source wave energy diffracts and spreads 404, travels to the end of the substrate, reflects from the edge 405 and ends up at the receive transducer 406 where it is of sufficient amplitude to be indistinguishable from that due to waves 407 returning from the receive array 408. In practice this means the desired response will have spurious artifacts that limit sensor accuracy.

The path length of the diffracted waves 404 is slightly less than the path length of the source waves that travel to the end of the source array, convert to a sensing mode, reconvert, and travel from the end of the receive array to the receive transducer. In practice this means that the desired response will have spurious artifacts due to diffraction towards the end of the desired response and limits sensor accuracy.

Figure 5:
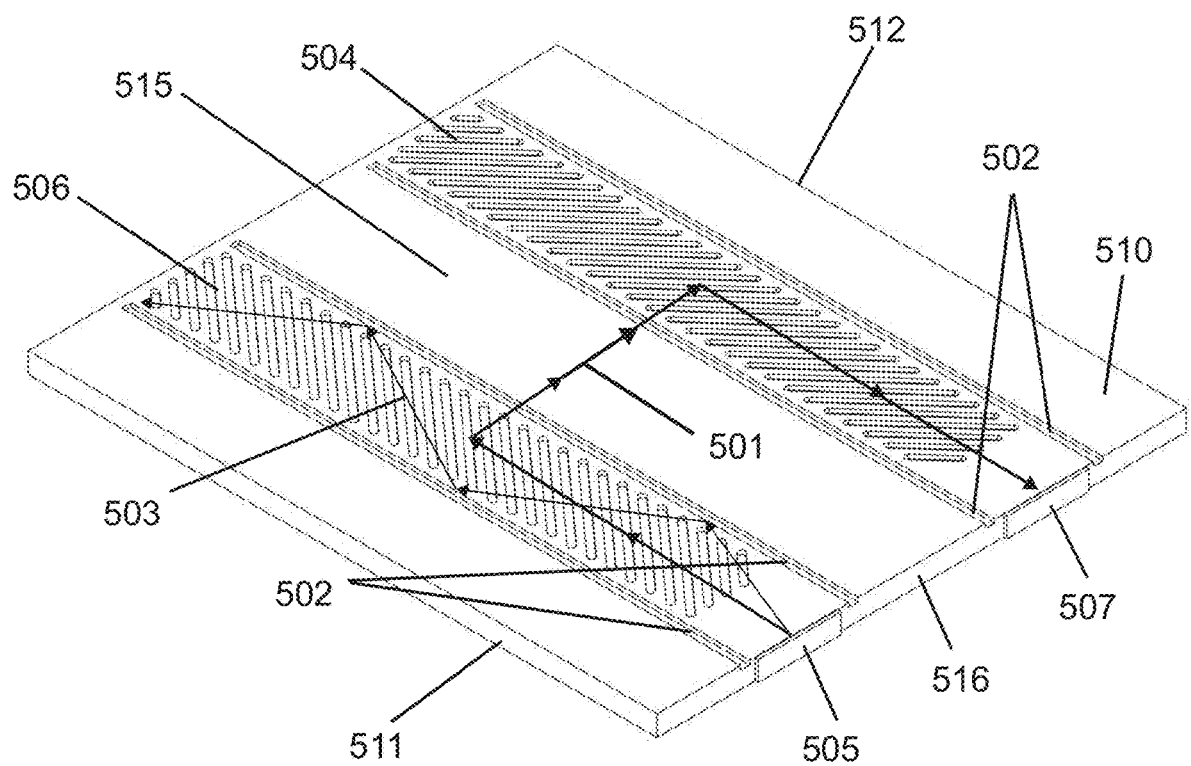
FIG. 5 illustrates an isometric rendition of a double array liquid level sensor showing collimation grooves according to embodiments of the present inventions.

We will explain beginning in FIG. 5 an approach to reduce this diffraction in array type liquid level sensors by adding collimation grooves at the edges of the arrays which internally reflect source waves and confine them to the source array.

FIG. 5 illustrates an isometric rendition of a double array liquid level sensor showing collimation grooves according to embodiments of the present inventions. A substrate 510 has a first edge 511 and a second edge 512. An acoustic source array 506 on the substrate between the first edge 511 and the second edge 512. An ultrasonic source transducer 505 is acoustically coupled to and located at an edge of the top substrate edge 516 and aligned with the end of array 506. A liquid level sensing region 515 on the substrate 510 lays next to the acoustic source array 506 on a side of the acoustic array opposite the first edge. A collimation groove 502 in the substrate 510 runs along a length of the acoustic source array 506 next to the liquid level sensing region 515. An acoustic receive array 504 on the substrate 510 between the acoustic source array 506 and the second edge 512. An ultrasonic receive transducer 507 is acoustically coupled to and located at a top edge 516 of the substrate and aligned with the end of array 504. The liquid level sensing region 515 lies between the acoustic source array 506 and the acoustic receive array 504. Another collimation groove 502 is shown in the substrate running along a length of the acoustic receive array 505 next to the liquid level sensing region 515.

FIG. 5 is an isometric rendition of a liquid level sensor showing the desired path of the source and sensing waves 501, and effects of collimation grooves 502. The grooves formed along the longitudinal edges cause the source waves to be confined within the arrays 503. By using the collimation grooves, diffraction is essentially eliminated as a source of spurious artifacts provided that the source shear waves are not of the zeroth order. The grooves are fabricated by the same process as the arrays and do not add extra cost to the manufacturing process.

The collimation grooves such as 502 can be located in the same front surface of the substrate as illustrated. Alternatively the collimation grooves can be located in the same back surface of the substrate or alternately in both the front and back surfaces of the substrate. The ultrasonic waves typically travel inside the substrate material and thus can be affected by collimation grooves in either or both sides of a substrate. Additionally, because the echelons of the arrays can be located on either side of the substrate, collimation grooves can go in opposite or same sides of the substrate as the arrays.

Figure 6:
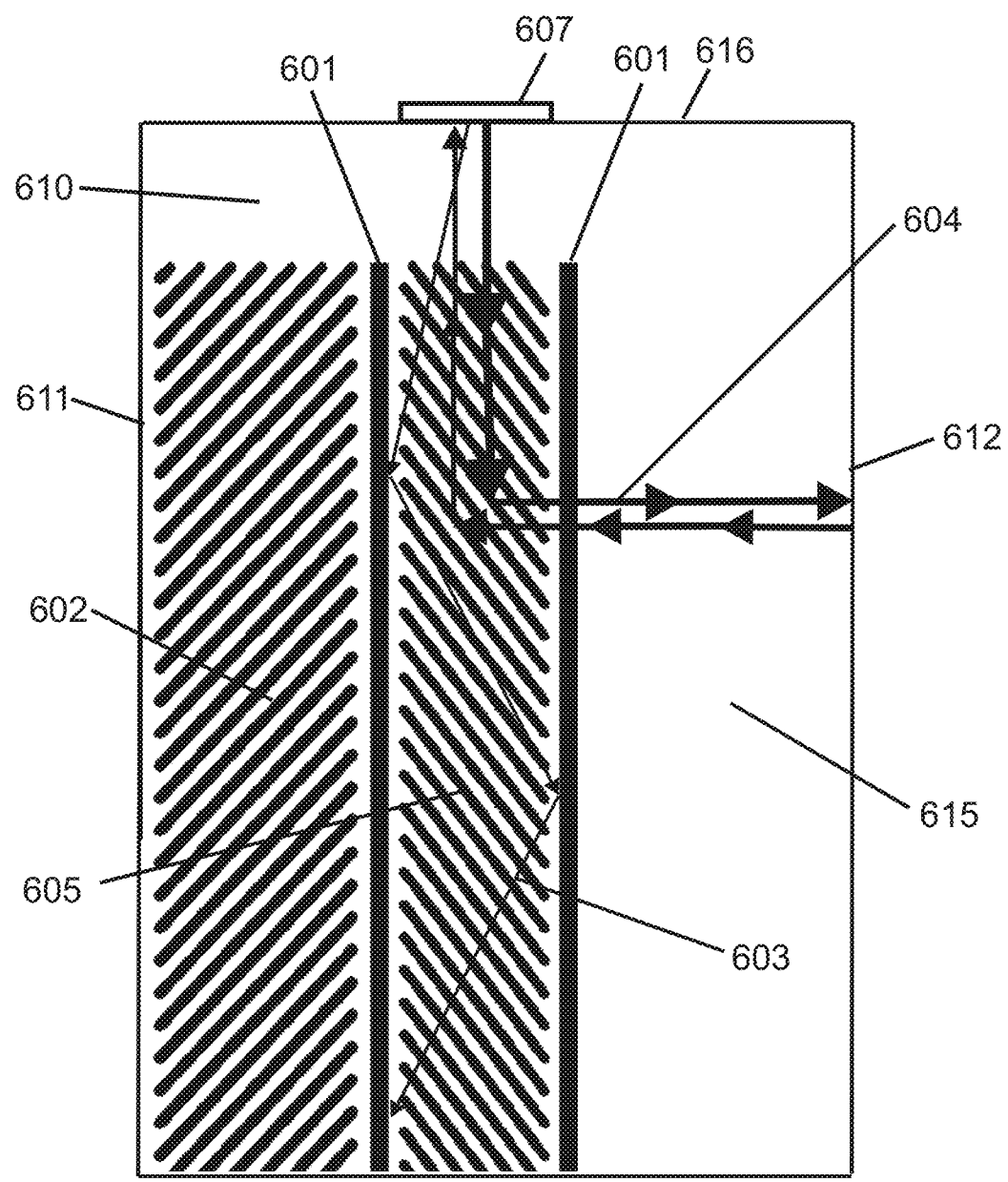
FIG. 6 illustrates a plan view of a single array liquid level sensor showing a collimation groove according to embodiments of the present inventions.

FIG. 6 illustrates a plan view of a single array liquid level sensor showing a collimation groove according to embodiments of the present inventions. A substrate 610 has a first edge 611 and a second edge 612. An acoustic send/receive array 605 is formed on the substrate between the first edge 611 and the second edge 612. An ultrasonic send/receive transducer 607 is acoustically coupled to and located at a top edge 616 of the acoustic array 605 on the substrate 610 or edge. A liquid level sensing region 615 lies between the acoustic array 605 and the second edge 612 of the substrate 610.

An acoustic diversion array 602 is formed on the substrate 610 between the first edge 611 and the acoustic array 605 and runs in parallel with the acoustic array 605. A liquid level sensing region 615 on the substrate lays next to the acoustic array 605 on a side of the acoustic array 605 opposite the acoustic diversion array 602.

The acoustic array 605 has echelons angled to divert a portion of ultrasonic energy from the ultrasonic transducer across the liquid level sensing region. The echelons run in parallel at a set angle, spacing, and alignment chosen to convert ultrasonic waves emitted from the ultrasonic source transducer in a first predetermined direction. The acoustic diversion array 602 has echelons running in parallel at a set angle, spacing, and alignment chosen to convert to a second predetermined direction at approximately a right angle to the first predetermined direction so that the acoustic wave travels perpendicular to the sensing mode.

A collimation groove 601 is formed in the substrate 610 running along a length of the acoustic array 605 next to the liquid level sensing region 615. Another collimation groove 601 is formed in the substrate 610 between the acoustic source array 605 and the acoustic diversion array 602. FIG. 6 shows the path of the sensing waves 604 and the confined source waves due to the collimation grooves are shown schematically as 603.

Figure 7:
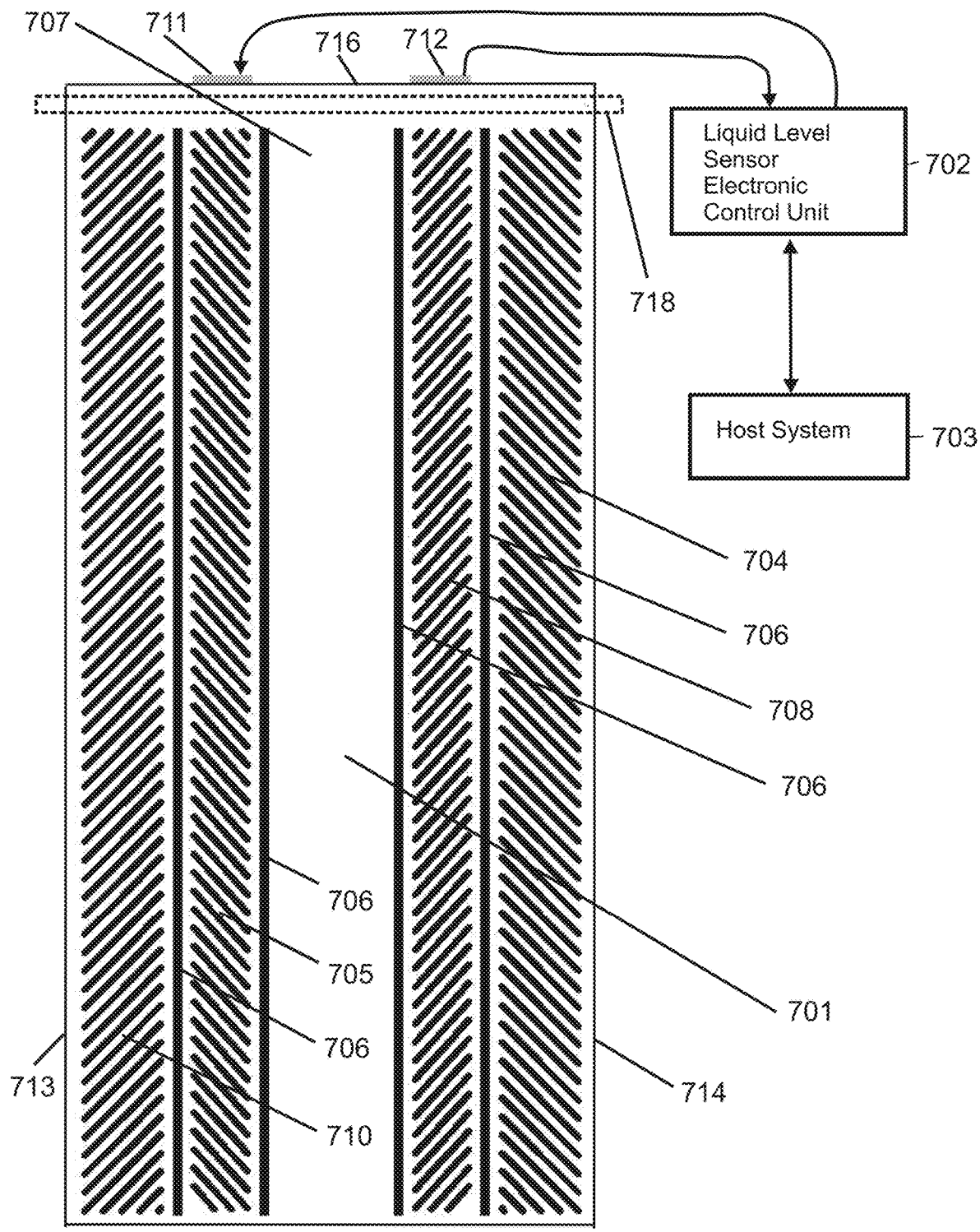
FIG. 7 illustrates a diagram of a double array liquid level sensor with associated controller and host according to embodiments of the present inventions.

FIG. 7 illustrates a diagram of a double array liquid level sensor with associated controller and host according to embodiments of the present inventions. A schematic of a double array liquid sensor with its controller is shown in FIG. 7. The controller 702 provides transducer excitation to transducer 711, signal amplification from the receive transducer 712 and the circuitry and firmware necessary to determine the transition time which is the measure of liquid level. This information is then sent to the host system 703 in the form of various standard industry data signal formats. On the substrate is the sensing region 701, and source and receive arrays 705 and 708 and diversion arrays 704 and 710 with four collimation grooves 706.

A substrate 707 has a first edge 713 and a second edge 714. An acoustic source array 705 is formed on the substrate 707 between the first edge 713 and the second edge 714. An ultrasonic send transducer 711 is acoustically coupled to a top edge 716 and aligned to the end of the acoustic source array 705 on the substrate 707. An acoustic receive array 708 is formed on the substrate 707 between the acoustic source array 705 and the second edge 714. An ultrasonic receive transducer 712 is acoustically coupled to the top edge 716 and aligned at an end of the acoustic receive array 708 on the substrate 707. A liquid level sensing region 701 lies between the acoustic source array 705 and the acoustic receive array 708.

An acoustic diversion array 710 is formed on the substrate between the first edge 713 and the source acoustic array 705 and runs in parallel with the acoustic source array 705. Another acoustic diversion array 704 is formed on the substrate next to a side of the acoustic receive array 708 opposite the acoustic source array 705. A liquid level sensing region 701 on the substrate lays next to the acoustic source array 705 on a side of the acoustic source array 705 opposite the acoustic diversion array 710.

The acoustic source array 705 and the acoustic receive array 708 each have echelons angled to divert a portion of ultrasonic energy from the ultrasonic transducer across the liquid level sensing region. The echelons are set to a specified angle with respect to the axes of the arrays. The echelons run in parallel at a set angle, spacing, and alignment chosen to convert ultrasound emitted from the ultrasonic source transductor in a first predetermined direction. Each acoustic diversion array 704, 710 has echelons running in parallel at a set angle, spacing, and alignment chosen to convert and divert to a second predetermined direction at approximately a right angle to the first predetermined direction so that the acoustic wave travels perpendicular to the sensing mode.

The ultrasonic sensor is immersed in a liquid to detect a level of the liquid, and aligned such that array axes are at right angles to the liquid surface. A plate 718 provides structural support and seals the transducers and associated electronics from the liquid and its vapors.

The use of diversion arrays to suppress multiple waves does add significant width to the substrate with a minimum width of five inches being typical. This can present problems with some liquid containing vessels where mounting hole diameters can be less than 5 inches. The solution is to take advantage of the fact that if the radius of curvature of a bend in a sensor substrate is greater than 2 to 3 times the wavelength of the sensing waves, it will have a negligible effect on wave transmission. Sensing waves have wavelengths that are typically in the 1 to 2 mm range, and practical bending radii are considerably greater, hence forming a sensor substrate with multiple bends to reduce width is a practical solution to width reduction.

Figure 8:
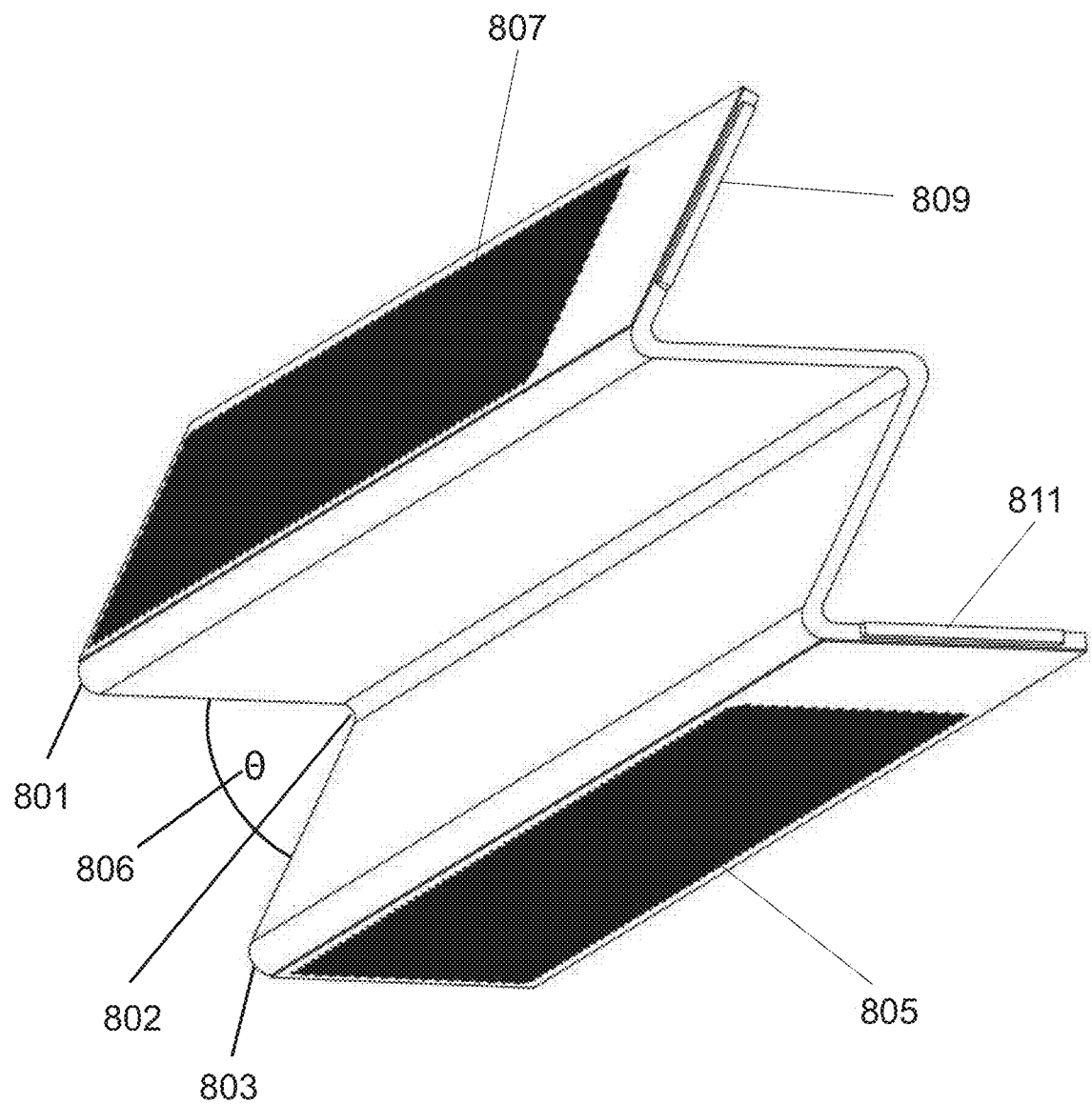
FIG. 8 illustrates an isometric rendition of a folded double array liquid level sensor according to embodiments of the present inventions.

FIG. 8 illustrates an isometric rendition of a folded double array liquid level sensor according to embodiments of the present inventions.

A substrate has a plurality of longitudinal folds 801, 802, 803 running parallel to and between the acoustic source array 807 and the acoustic receive array 805. An acoustic source array 807 and an ultrasonic send transducer 809 is on one side of the plurality of folds and an acoustic receive array 805 and an ultrasonic receive transducer 811 on an opposite side of the folds. The liquid level sensing region is among the folds. A diversion array can be added to the outside of acoustic array 805, 807 with or without an additional fold.

The sensor width can be substantially reduced by forming a series of multiple bends or folds 801, 802 and 803 in parallel to an array axis as shown in FIG. 8 where diversion arrays have been omitted for clarity. This takes advantage of the fact that as long as the radius of curvature of the folds 801, 802 and 803 is greater by a factor of 2 or 3 times the wavelength of the sensing waves, they will have a negligible effect on wave transmission. Sensing waves are typically in the 1 to 2 mm range, hence folding is a practical solution to reducing sensor width. The folds also have the advantage of mechanically stiffening the sensor. Also shown is the bend angle θ 806 with the source and receive array pair 805 and 807, and attached transducers 809 and 811.

Assuming a sensor substrate of width W is folded into a square cross section with diagonal D selected to be less than the diameter of a mounting hole, the formula for the number of folds N for a given W and required D is given by:

$$N = \sqrt{\left(2\frac{W^2}{D^2} - 1\right)} - 1$$

The bending angle θ can now be determined from the following expression:

$$\operatorname{Tan}\left(\frac{\theta}{2}\right) = \frac{1}{N+1}$$

As an example if the sensor width is 6 inches wide and we require the diagonal of the folded square cross section to be less than 2 inches, we have according to the formulae a minimum number of folds equal to 4 with a fold angle of approximately 23 degrees.

Acoustic array sensors with multiple folds are a practical solution to width reduction to accommodate mounting hole requirements. They do require specialized equipment and add processing costs and are more appropriate for large volume applications.

Figure 9:
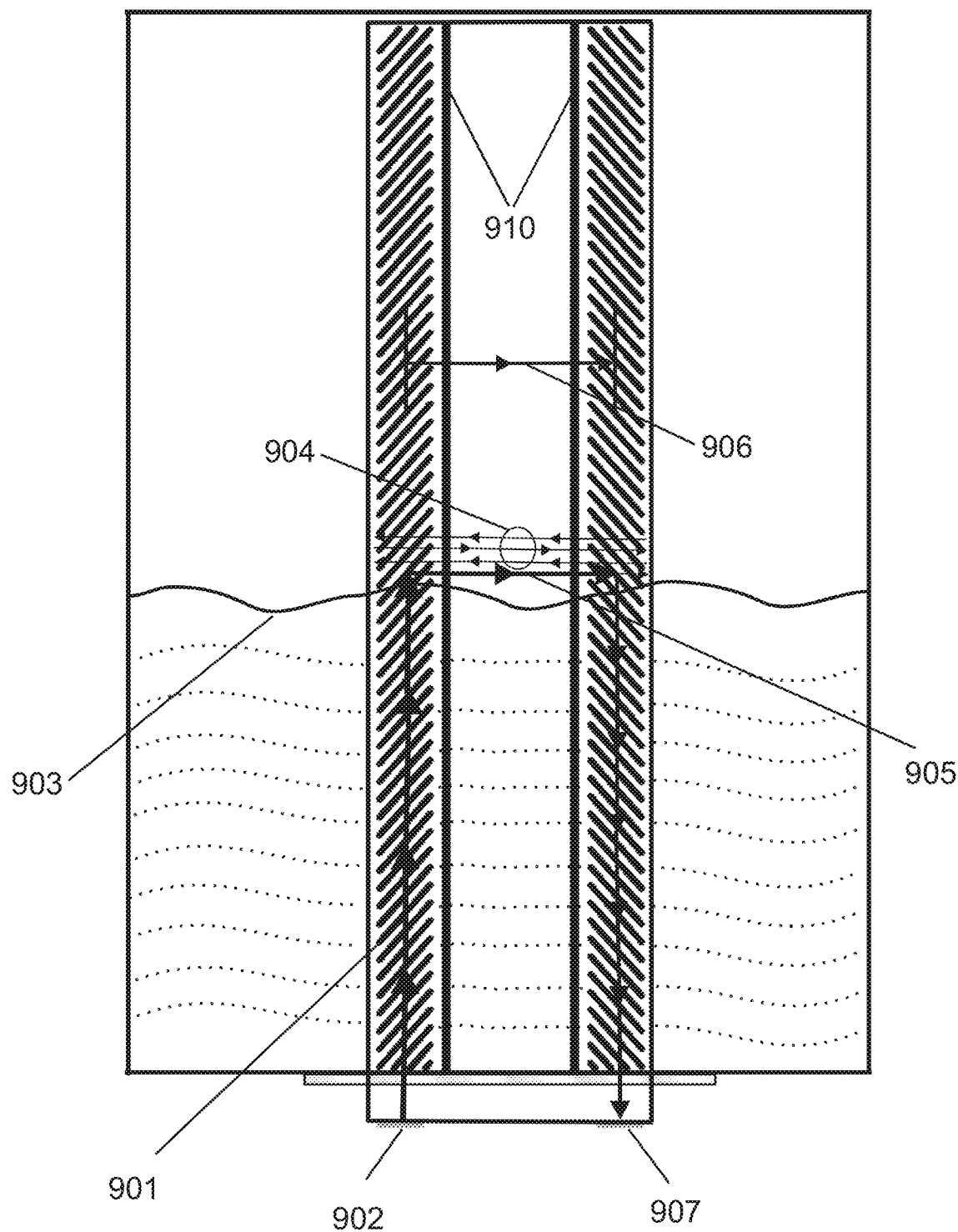
FIG. 9 illustrates a plan diagram of a double array liquid level sensor showing operation in an inverted mode according to embodiments of the present inventions.

FIG. 9 illustrates a plan diagram of a double array liquid level sensor showing operation in an inverted mode according to embodiments of the present inventions. All array type acoustic level sensors described heretofore were designed to be mounted from the top of the liquid container with a signal transition of high to low amplitude at the liquid surface interface. Because source shear waves, in contrast to sensing waves are not materially absorbed by liquids, it is possible to mount the sensor from the base of a liquid container as shown in FIG. 9, in what is termed an inverted mode. The primary source waves 901 now travel upwards from the send transducer 902 through the liquid 903. This has the advantage that sensing waves are absorbed in the liquid, hence no multiple reflections can occur when the source waves 901 are traveling upwards through the liquid from send array transducer 902 to the liquid surface 903. Thus, nothing will be received at the receive transducer 907 due to essentially complete absorption of sensing waves by the liquid. The sensor response at the surface now transitions from low amplitude to high because sensing waves are no longer absorbed. Above the liquid surface due to the presence of sensing waves, multiples will be initiated 904. The essential point is that the first multiple reflections need to travel twice the width of the substrate before they can interfere with the desired sensing wave path 905, compared to the desired signal which only needs to traverse the array separation 906. Thus, there is a period at the transition from low to high signal amplitude due to the delay in time of multiple sensing waves with respect to that of the desired sensing path 905, when the signal is free of spurious artifacts and the transition time from low to high can be accurately determined. As an example, assume the sensing waves are zeroth order Lamb modes with a typical group velocity of 1 inch of travel per 10 microseconds. With a 5 inch wide sensor, the leading edge of the multiply reflected sensing waves will take 100 microseconds delay to complete a round trip across the sensor substrate. Assuming a 4 inch separation between the centers of each array 906, the time for sensing waves to travel from the source to the receive arrays is 40 microseconds, thus there will be approximately a 60 microsecond delay between the desired response and the spurious components. A typical source wave frequency is 2.5 MHz thus, there will be about 150 source waves appearing at the receive transducer at the low/high transition before any spurious components due to multiple substrate edge reflections. This is more than sufficient to accurately determine the low to high transition time. Inverted sensors therefore do not require diversion arrays, dampening strips or other methods of suppressing multiple reflections, collimation grooves 910 are still necessary however, because source wave diffraction effects are not substantially affected by liquid immersion.

Figure 10:
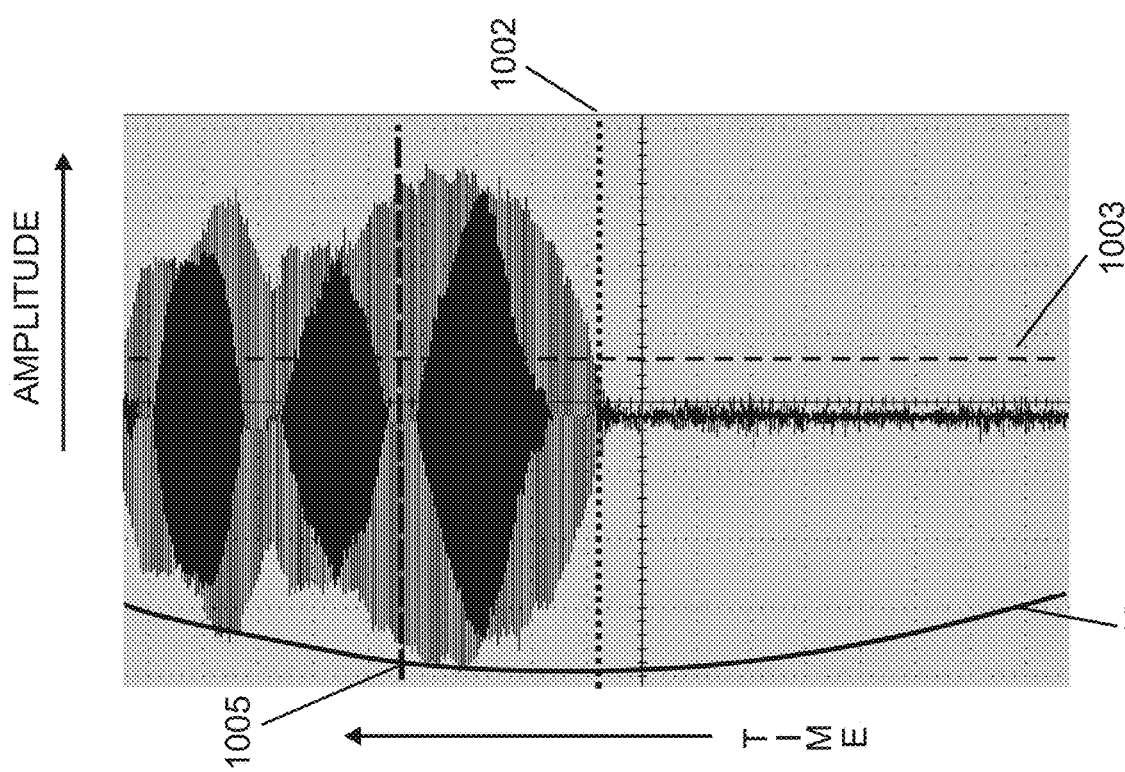
FIG. 10 illustrates an oscilloscope trace of a signal response of an inverted liquid level sensor according to embodiments of the present inventions.

FIG. 10 illustrates an oscilloscope trace of a signal response of an inverted liquid level sensor according to embodiments of the present inventions.

Figure 11:
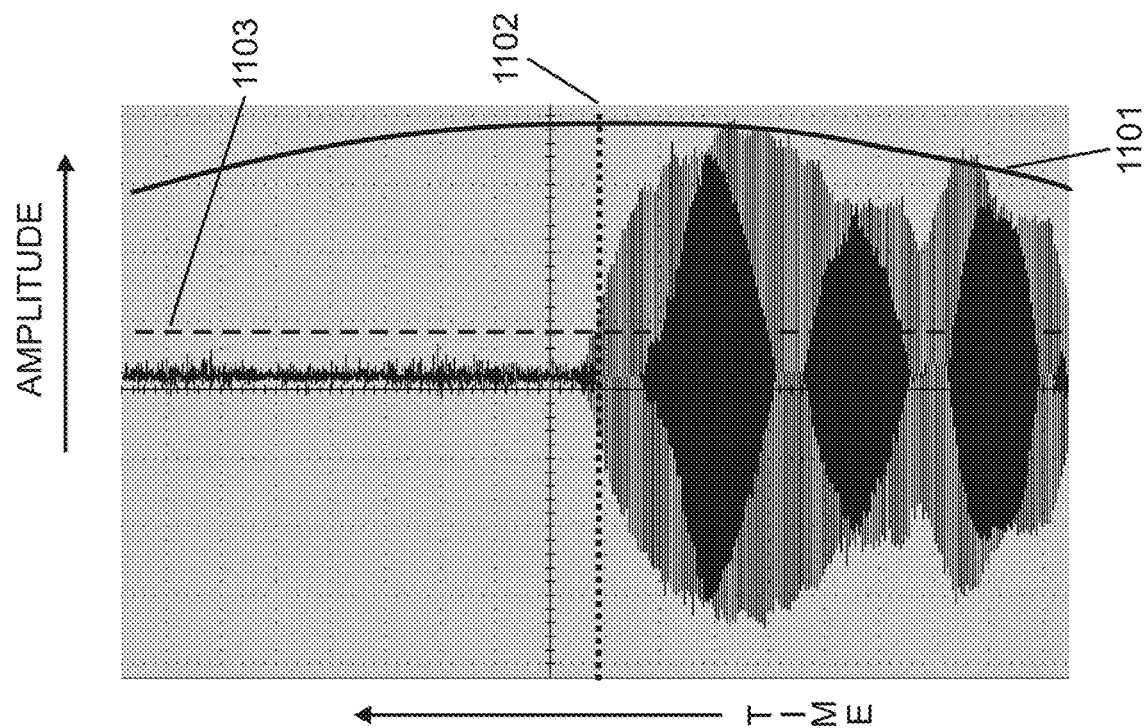
FIG. 11 illustrates an oscilloscope trace of a signal response of a non-inverted liquid level sensor according to embodiments of the present inventions.

FIG. 11 illustrates an oscilloscope trace of a signal response of a non-inverted liquid level sensor according to embodiments of the present inventions.

The response 1001 compared to 1101 illustrates the contrast between them at the liquid level transition. Here time from the send transducer burst is plotted vertically and the amplitude response is plotted horizontally. The horizontal dotted line 1002 represents the time at which the response of the inverted type exceeds an amplitude threshold 1003, and this is linearly dependent on liquid level. With the non-inverted type the transition is from high to low. Here the dotted line 1102 represents the time for which the response falls below the amplitude threshold of 1103 and is also linearly dependent on liquid level.

FIGS. 10 and 11 compared side-by-side together show the difference between the inverted 1001 and the non-inverted response 1101. Here time from the send transducer excitation burst is plotted vertically and the amplitude response of the receive transducer plotted horizontally. The horizontal dotted line 1002 represents the time at which the response exceeds an amplitude threshold. The vertical line 1003 for the inverted sensor represents an amplitude threshold. The time to this threshold amplitude is the measure of the time when the primary source waves exit the liquid. The other horizontal line 1005 represents the time for which multiple spurious waves are absent. Vertical dotted line 1103 represents the amplitude threshold for a non-inverted sensor with diversion arrays. Here 1003 and 1103 represent the time when the amplitude response is below the threshold and the measure of the time the primary source waves enter the liquid.

Operating in the inverted mode eliminates the need for suppressing multiples with dampening strips or diversion arrays. Spurious artifacts due to diffraction remain however and methods to reduce the deleterious effects of diffraction must still be employed. Inverted sensors have the desirable property that they can be narrower than those with diversion arrays, but requiring that they be mounted from the base of a liquid holding tank is a serious restriction. Mounting an inverted sensor from the top of a tank is possible however as shown in FIG. 12.

Figure 12:
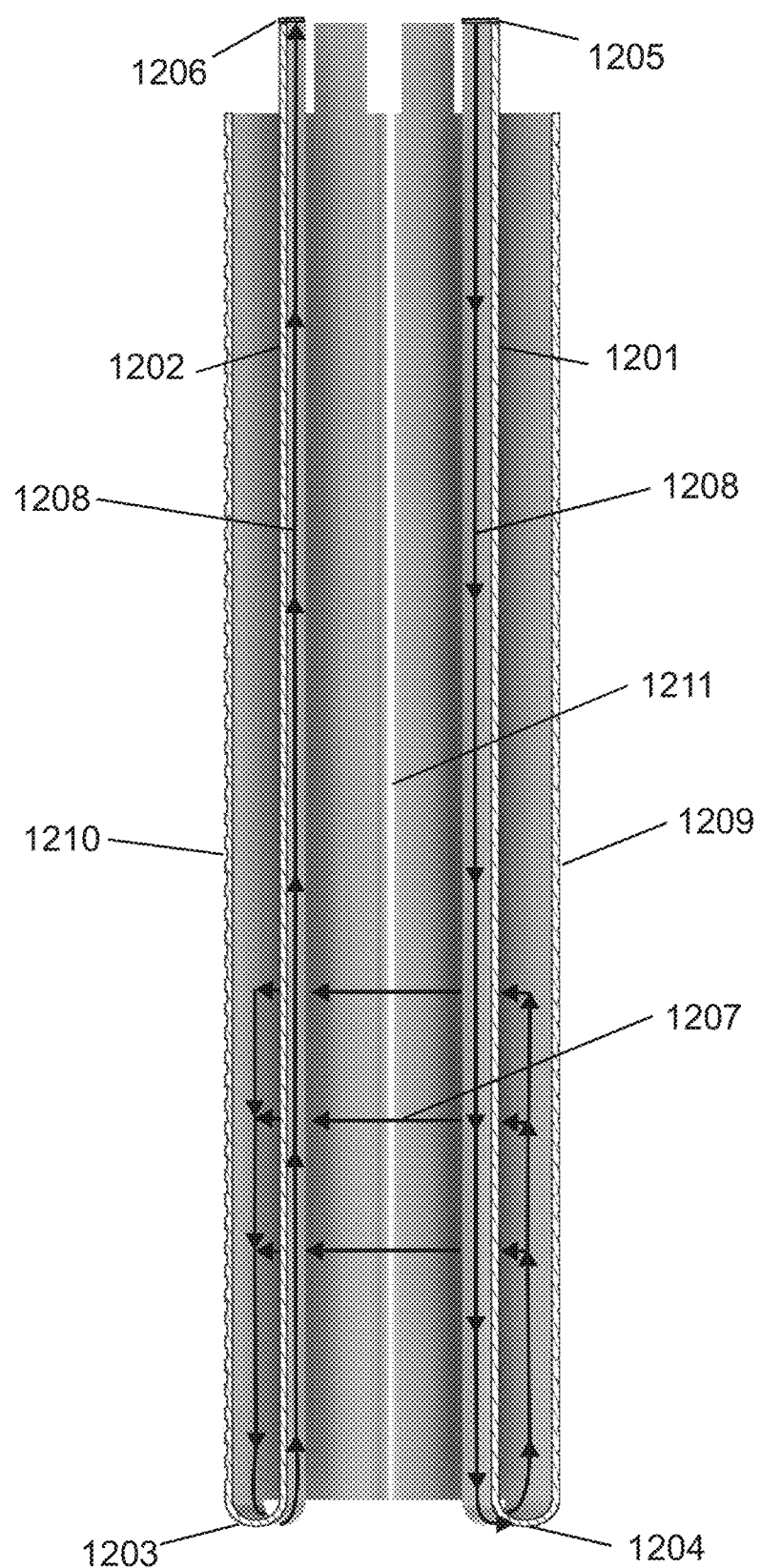
FIG. 12 illustrates an isometric back view of a top mounted inverted liquid level sensor according to embodiments of the present inventions.

FIG. 12 illustrates an isometric back view of a top mounted inverted liquid level sensor according to embodiments of the present inventions. A substrate has a first edge and a second edge. An acoustic source array 1209 is formed on the substrate between the first edge and the second edge. The substrate has an acoustic feed strip 1201 having a bend 1204 in the substrate making a 180 degree U-turn at a first bend, the first end after the bend is proximate to the acoustic array. The radius of curvature of the bend is several times greater than the source wavelength. An ultrasonic send transducer 1205 is acoustically coupled to and located at a second end of the feed strip 1201. An acoustic receive array 1210 is formed on the substrate between the acoustic source array 1209 and the second edge. The substrate has an another acoustic feed strip 1202 having a bend 1203 in the substrate making a 180 degree U-turn at a first bend, the first end after the bend is proximate to the acoustic receive array 1210. The radius of curvature of bend 1203 is similar to that of 1204. An ultrasonic receive transducer 1206 acoustically coupled to and located at an end of the feed strip 1202. A liquid level sensing region is on the substrate lying between the acoustic source array 1209 and the acoustic receive array 1210. The strips are formed in the same substrate material by machining and bending the substrate. The material for the substrate can be a metal, plastic, or ceramic material that bends or can be formed with a bend.

The substrate has at least one longitudinal fold running parallel to and between the acoustic source array 1209 and the acoustic receive array 1210.

The feed strip 1201 has a length between its bend 1204 and the send ultrasonic transducer 1205 that runs along an entire length of the acoustic source array 1209, thereby being top fed. Another feed strip 1202 has a length between its bend 1203 and the receive ultrasonic transducer 1206 that runs along an entire length of the acoustic receive array 1210, thereby being top fed.

Figure 13:
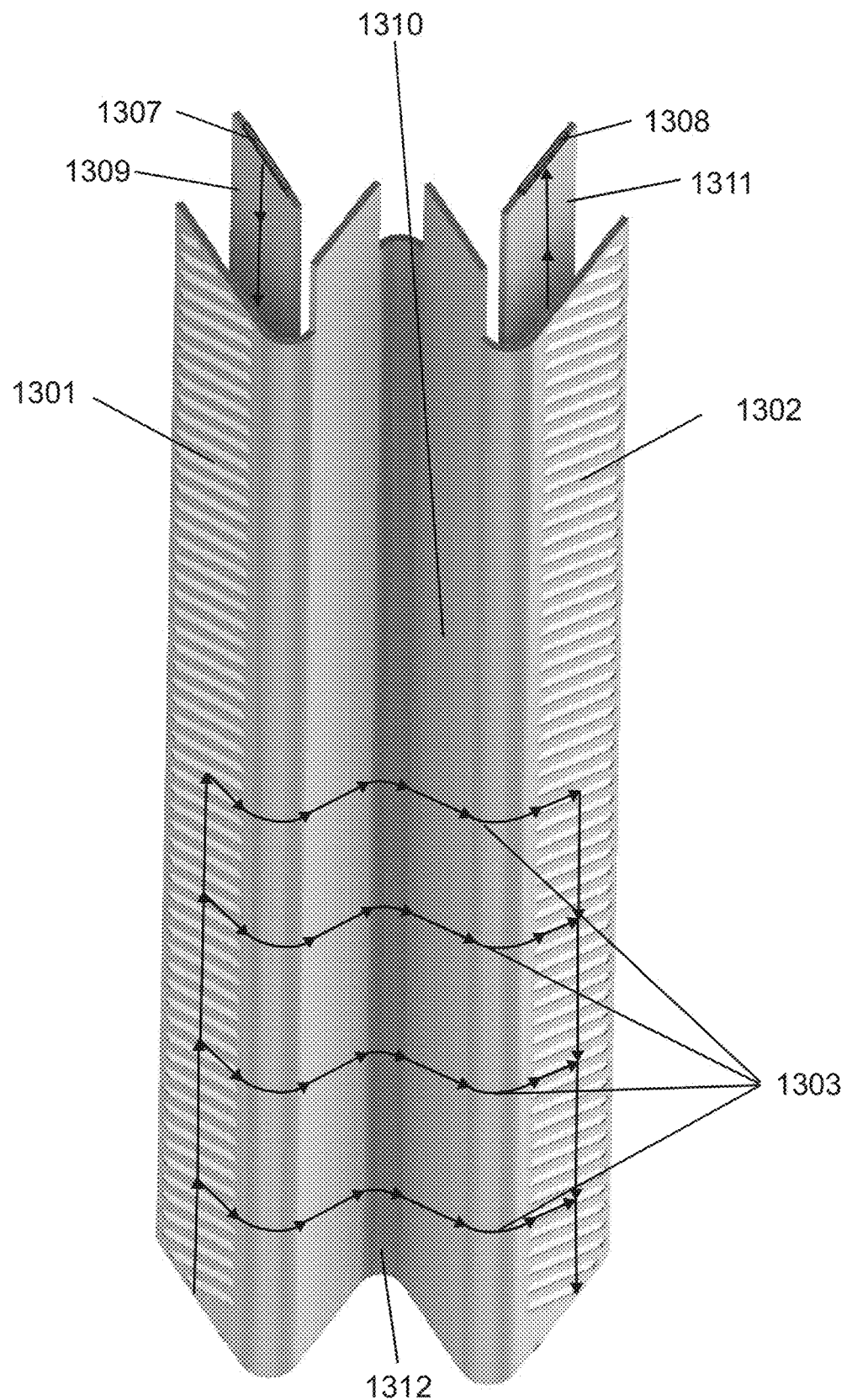
FIG. 13 illustrates an isometric front view of a top-mounted inverted liquid level sensor of FIG. 12 according to embodiments of the present inventions.

FIG. 13 illustrates an isometric front top view of a top-mounted inverted liquid level sensor of FIG. 12 according to embodiments of the present inventions. A substrate has a first edge and a second edge. An acoustic source array 1301 is formed on the substrate between the first edge and the second edge. A feed strip 1309 having a bend between the acoustic array and an ultrasonic send transducer 1307. An acoustic receive array 1302 is formed on the substrate between the acoustic source array 1301 and the second edge. Another feed strip 1311 having a bend between the acoustic receive array 1302 and an ultrasonic receive transducer 1308. A liquid level sensing region 1310 lies between the acoustic source array 1301 and the acoustic receive array 1302.

The substrate has at least one longitudinal fold 1312 running parallel to and between the acoustic source array 1301 and the acoustic receive array 1302.

Figure 14:
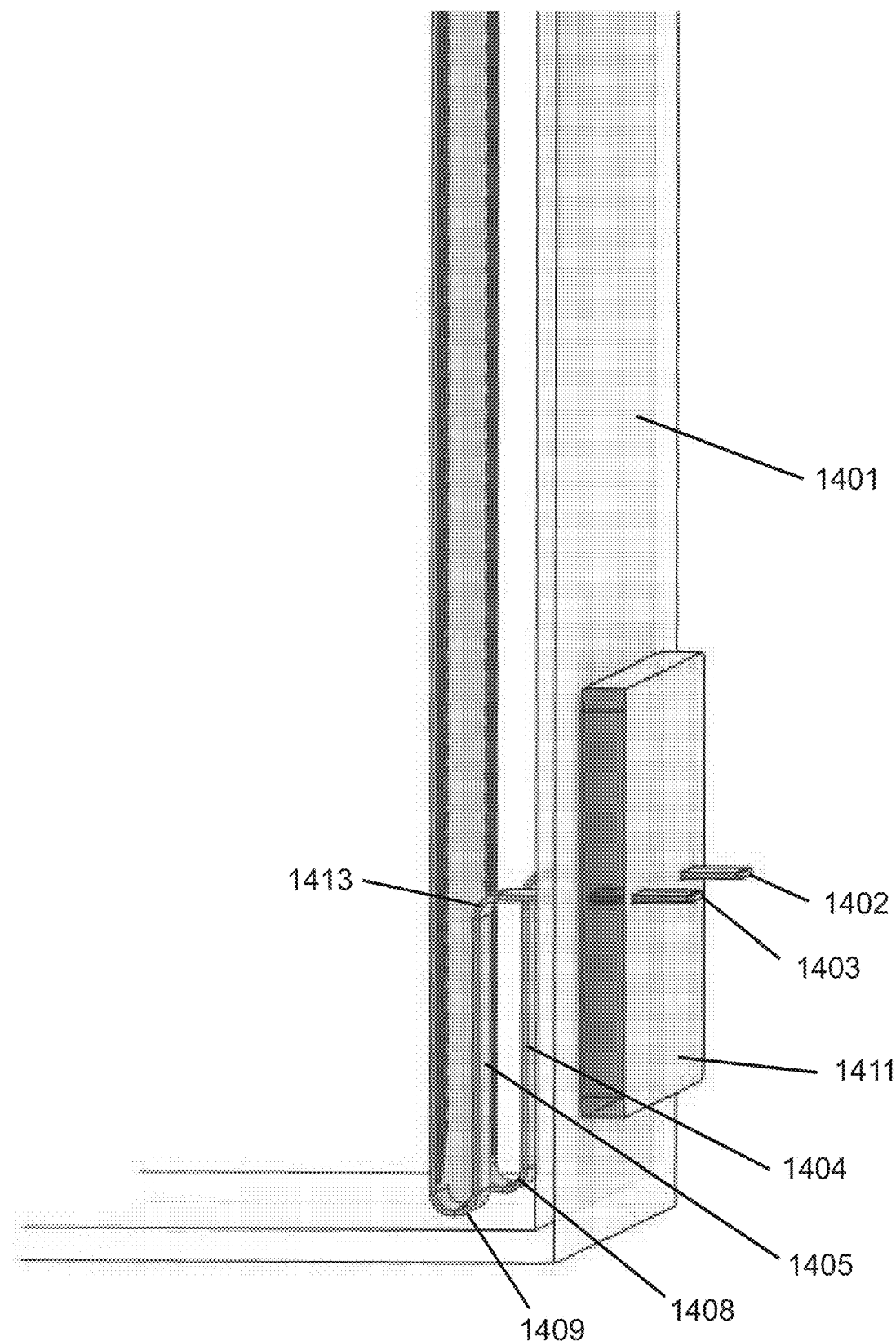
FIG. 14 illustrates a side isometric view of an inverted liquid level sensor mounted through a side of a tank according to embodiments of the present inventions.

FIG. 14 illustrates a side isometric view of an inverted liquid level sensor mounted through a side of a tank according to embodiments of the present inventions. A substrate has a first edge and a second edge. An acoustic source array is formed on the substrate between the first edge and the second edge. The substrate has a feed strip 1405 having a bend 1409 in the substrate making a 180 degree U-turn at a first end, at the end of the acoustic array. An ultrasonic send transducer 1403 is acoustically coupled to and located at a second end of the feed strip 1405. An acoustic receive array is formed on the substrate between the acoustic source array and the second edge. The substrate has another feed strip 1404 having a bend 1408 in the substrate making a 180 degree U-turn at a first end, the first end at the end of its respective acoustic receive array. An ultrasonic receive transducer 1402 is acoustically coupled to and located at an end of another feed strip 1404. A liquid level sensing region is on the substrate lying next to the acoustic array on a side of the acoustic array.

A tank 1401 having side walls comprising a first opening and a second opening, each of the first opening and the second opening between an inside and an outside of the tank 1401. The feed strip 1405 passes through the first opening with the send ultrasonic transducer 1403 located outside the tank 1401 and the substrate located inside the tank 1401. The receive feed strip 1404 passes through the second opening with the receive ultrasonic transducer 1402 located outside the tank 1401 and the substrate located inside the tank 1401. The feed strip 1405 has a bend 1413 of approximately 90 degree right angle to pass through the first opening in the tank 1401. The other feed strip 1404 also has a bend of approximately 90 degree right angle to pass through the first opening in the tank 1401.

Acoustic feed strips can also be employed to allow for side mounted liquid level sensors as shown in the side view of FIG. 14. The two feed strips 1404 and 1405 are formed with an additional bend each, as compared to the previous top mounted version to facilitate side mounting. As discussed as long as the radius of curvature of the bends is greater than several wavelengths, there will be no effect on acoustic transmission. The feed strips pass through the tank wall 1401 and a mounting plate 1411 with transducers 1402 and 1403 bonded to the end of the strips.

Figure 15:
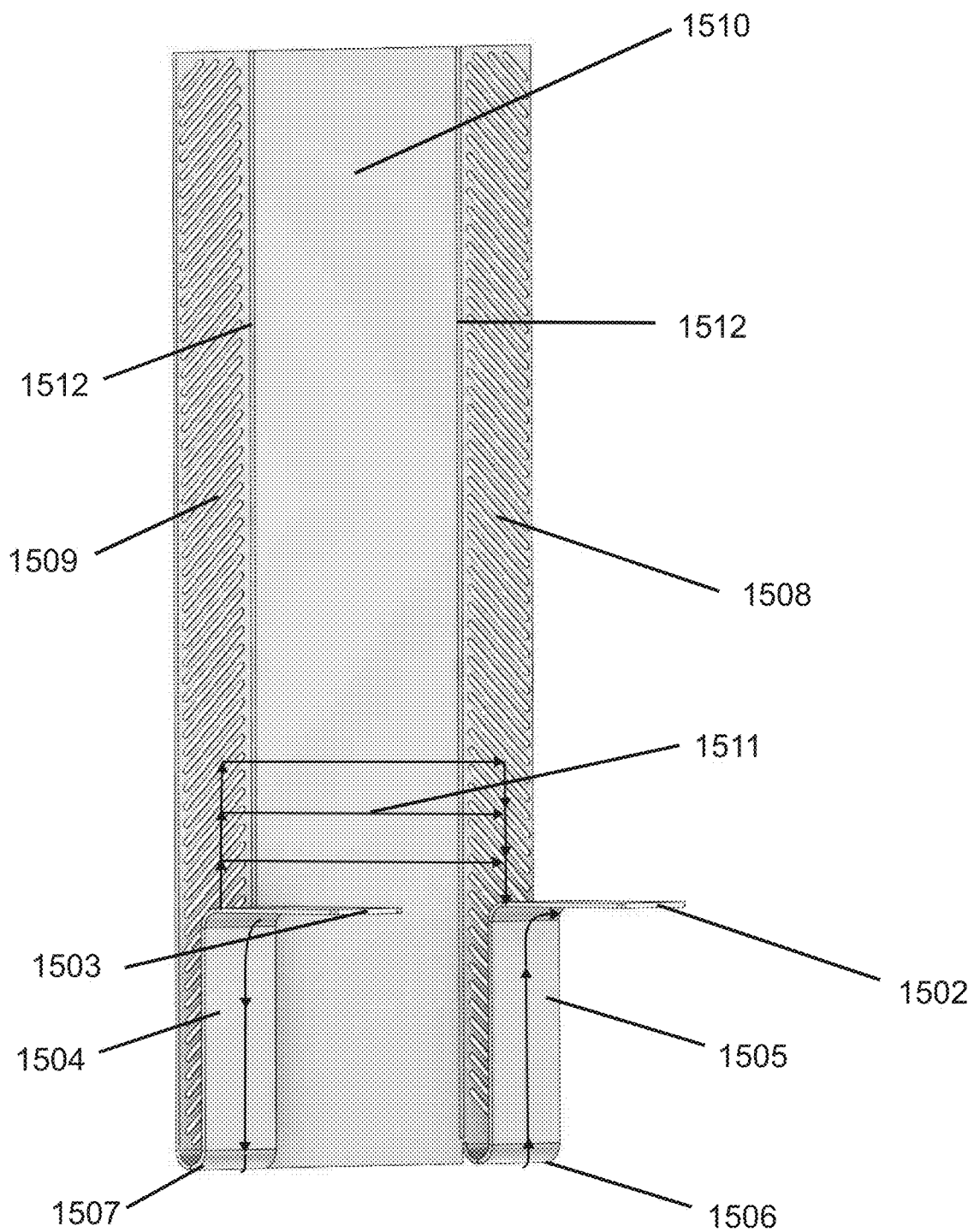
FIG. 15 illustrates a front isometric view of the inverted liquid level sensor side of FIG. 14 according to embodiments of the present inventions.

FIG. 15 illustrates a front isometric view of the inverted liquid level sensor side of FIG. 14 according to embodiments of the present inventions. FIG. 15 shows the same sensor as FIG. 14 in a front view of the arrays 1508 and 1509, with collimation grooves 1512 and the signal path 1511.

A substrate has a first edge and a second edge. An acoustic source array 1509 is formed on the substrate between the first edge and the second edge. A feed strip 1504 having a bend 1507 makes a 180 degree U-turn at a first end, proximate to the acoustic source array 1509. An ultrasonic send transducer 1503 is acoustically coupled to and located at a second end of the feed strip 1504. An acoustic receive array 1508 is formed on the substrate between the acoustic source array 1509 and the second edge. Another feed strip 1505 having a bend 1506 makes a 180 degree U-turn at a first end, the first end after the bend is proximate to the acoustic receive array 1508. An ultrasonic receive transducer 1502 is acoustically coupled to and located at an end of the another feed strip 1505. A liquid level sensing region 1510 lies between the acoustic source array and the acoustic receive array 1508.

The substrate can have one or more longitudinal folds running parallel to and between the acoustic source array 1509 and the acoustic receive array 1508.

A collimation groove 1512 in the substrate runs along a length of the acoustic source array 1509 next to the liquid level sensing region 1510. Another collimation groove 1512 in the substrate running along a length of the acoustic receive array 1508 next to the liquid level sensing region 1510.

The feed strip 1504 has a length between its bend 1507 and the send ultrasonic transducer 1503 that runs along a partial length of the acoustic source array 1503, thereby being side fed. Another feed strip 1505 has a length between its bend 1506 and the receive ultrasonic transducer 1502 that runs along a partial length of the acoustic receive array 1508, thereby being side fed.

Any letter designations such as (a) or (b) etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

Unless stated otherwise, terms such as "first" and "second" are used to arbitrarily distinguish between the elements such terms describe. Thus, these terms are not necessarily intended to indicate temporal or other prioritization of such elements.

Any trademarks listed herein are the property of their respective owners, and reference herein to such trademarks is generally intended to indicate the source of a particular product or service.

The abstract and the title are provided to comply with the rules requiring an abstract and a title that will allow a searcher or other reader to quickly ascertain the subject matter of the technical disclosure. It is submitted with the understanding that they will not be used to interpret or limit the scope or meaning of the claims. 37 CFR 1.72(b).

Although the inventions have been described and illustrated in the above description and drawings, it is understood that this description is by example only, and that numerous changes and modifications can be made by those skilled in the art without departing from the true spirit and scope of the inventions. Although the examples in the drawings depict only example constructions and embodiments, alternate embodiments are available given the teachings of the present patent disclosure.

What is claimed is:

1. An ultrasonic sensor for detecting a level of a liquid, the ultrasonic sensor comprising:
    a substrate having a first edge and a second edge;
    an acoustic array on the substrate between the first edge and the second edge;
    an ultrasonic transducer on the substrate and acoustically coupled to an end of the acoustic array;
    an acoustic diversion array on the substrate between the first edge and the acoustic array and running in parallel with the acoustic array; and
    a liquid level sensing region on the substrate lying next to the acoustic array on a side of the acoustic array opposite the acoustic diversion array.

2. An ultrasonic sensor according to claim 1, wherein the acoustic array has echelons angled to divert a portion of ultrasonic energy from the ultrasonic transducer across the liquid level sensing region.

3. An ultrasonic sensor according to claim 2, wherein the acoustic diversion array has echelons angled at about 45 degrees relative to a length of the acoustic diversion array.

4. An ultrasonic sensor according to claim 1, wherein the ultrasonic sensor further comprises a collimation groove in the substrate running along a length of the acoustic array next to the liquid level sensing region.

5. An ultrasonic sensor according to claim 1,
    wherein the ultrasonic transducer both sends and receives; and
    wherein the liquid level sensing region lies between the second edge and the acoustic array.

6. An ultrasonic sensor according to claim 1,
    wherein the acoustic array is an acoustic source array on the substrate;
    wherein the ultrasonic transducer is a ultrasonic send transducer on the substrate and acoustically coupled to an end of the acoustic source array on the substrate;
    wherein the ultrasonic sensor further comprises
    an acoustic receive array on the substrate between the acoustic source array and the second edge;
    an ultrasonic receive transducer on the substrate and acoustically coupled to an end of the acoustic receive array on the substrate; and
    wherein the liquid level sensing region lies between the acoustic source array and the acoustic receive array.

7. The ultrasonic sensor according to claim 6, wherein the ultrasonic sensor further comprises
    another acoustic diversion array on the substrate next to a side of the acoustic source array opposite the acoustic receive array.

8. An ultrasonic sensor according to claim 6,
    wherein the ultrasonic sensor further comprises a collimation groove in the substrate running along a length of the acoustic source array next to the liquid level sensing region; and
    wherein the ultrasonic sensor further comprises another collimation groove in the substrate running along a length of the acoustic receive array next to the liquid level sensing region.

9. The ultrasonic sensor according to claim 6, wherein each of the acoustic source array and the acoustic receive array has echelons running in parallel at a set angle, spacing, and alignment chosen to convert to a predetermined mode.

10. The ultrasonic sensor according to claim 6,
    wherein each of the acoustic source array and the acoustic receive array have echelons running in parallel at a set angle, spacing, and alignment chosen to convert ultrasound emitted from the ultrasonic source transductor in a first predetermined direction; and
    wherein the acoustic diversion array has echelons running in parallel at a set angle, spacing, and alignment chosen to convert to a second predetermined direction at approximately a right angle to the first predetermined direction.

11. The ultrasonic sensor according to claim 6, wherein the substrate has a plurality of longitudinal folds running parallel to and between the acoustic source array and the acoustic receive array.

12. An ultrasonic sensor for detecting a level of a liquid, the ultrasonic sensor comprising:
    a substrate having a first edge and a second edge;
    an acoustic array on the substrate between the first edge and the second edge;
    an ultrasonic transducer on the substrate and acoustically coupled to an end of the acoustic array on the substrate;
    a liquid level sensing region on the substrate lying next to the acoustic array on a side of the acoustic array opposite the first edge; and
    a collimation groove in the substrate running along a length of the acoustic array next to the liquid level sensing region.

13. An ultrasonic sensor according to claim 12,
    wherein the ultrasonic transducer both sends and receives; and
    wherein the liquid level sensing region lies between the second edge and the acoustic array.

14. An ultrasonic sensor according to claim 12,
    wherein the acoustic array is an acoustic source array on the substrate;
    wherein the ultrasonic transducer is a ultrasonic source transducer on the substrate and acoustically coupled to an end of the acoustic source array on the substrate;
    wherein the ultrasonic sensor further comprises an acoustic receive array on the substrate between the acoustic source array and the second edge;
    an ultrasonic receive transducer on the substrate and acoustically coupled to an end of the acoustic receive array on the substrate;
    wherein the liquid level sensing region lies between the acoustic source array and the acoustic receive array; and
    another collimation groove in the substrate running along a length of the acoustic receive array next to the liquid level sensing region.

15. The ultrasonic sensor according to claim 14, wherein the ultrasonic sensor further comprises
    a first acoustic diversion array on the substrate between the first edge and the acoustic source array and running in parallel with the acoustic source array;
    an additional collimation groove in the substrate between the acoustic source array and the acoustic diversion array;
    an second acoustic diversion array on the substrate between the second edge and the acoustic receive array and running in parallel with the acoustic receive array; and
    a further additional collimation groove in the substrate between the acoustic receive array and the second acoustic diversion array.

16. The ultrasonic sensor according to claim 14, wherein the substrate has a plurality of longitudinal folds running parallel to and between the acoustic source array and the acoustic receive array.

17. The ultrasonic sensor according to claim 12, wherein the ultrasonic sensor further comprises
    an acoustic diversion array on the substrate between the first edge and the acoustic array and running in parallel with the acoustic array; and
    another collimation groove in the substrate between the acoustic source array and the acoustic diversion array.

18. An ultrasonic sensor for detecting a level of a liquid, the ultrasonic sensor comprising: a substrate having a first edge and a second edge; an acoustic array on the substrate between the first edge and the second edge; wherein the substrate comprises a feed strip having a bend in the substrate at a first end of the feed strip, the first end after the bend is acoustically coupled to the acoustic array; an ultrasonic transducer located on the feed strip and acoustically coupled to a second end of the feed strip; and a liquid level sensing region on the substrate lying next to the acoustic array on a side of the acoustic array.

19. An ultrasonic sensor according to claim 18, wherein the ultrasonic sensor further comprises a collimation groove in the substrate running along a length of the acoustic array next to the liquid level sensing region.

20. An ultrasonic sensor according to claim 18,
    wherein the acoustic array is an acoustic source array on the substrate;
    wherein the ultrasonic transducer is an ultrasonic send transducer located on the feed strip and acoustically coupled to a second end of the acoustic feed strip on the substrate;
    wherein the ultrasonic sensor further comprises
    an acoustic receive array on the substrate between the acoustic source array and the second edge;
    wherein the substrate comprises another feed strip having a bend in the substrate at a first end of the another feed strip, the first end after the bend is acoustically coupled to the acoustic receive array;
    an ultrasonic receive transducer located on the feed strip and acoustically coupled to a second end of the another feed strip; and
    wherein the liquid level sensing region lies between the acoustic source array and the acoustic receive array.

21. The ultrasonic sensor according to claim 20, wherein the substrate has at least one longitudinal fold running parallel to and between the acoustic source array and the acoustic receive array.

22. An ultrasonic sensor according to claim 20,
wherein the ultrasonic sensor further comprises a collimation groove in the substrate running along a length of the acoustic source array next to the liquid level sensing region; and
wherein the ultrasonic sensor further comprises another collimation groove in the substrate running along a length of the acoustic receive array next to the liquid level sensing region.

23. The ultrasonic sensor according to claim 22, wherein the substrate has at least one longitudinal fold running parallel to and between the acoustic source array and the acoustic receive array.

24. The ultrasonic sensor according to claim 20,
wherein the feed strip has a length between its bend and the send ultrasonic transducer that runs along an entire length of the acoustic source array, thereby being top fed; and
wherein the another feed strip has a length between its bend and the receive ultrasonic transducer that runs along an entire length of the acoustic receive array, thereby being top fed.

25. The ultrasonic sensor according to claim 20, wherein the feed strip has a length between its bend and the send ultrasonic transducer that runs along a partial length of the acoustic source array, thereby being side fed; and wherein the another feed strip has a length between its bend and the receive ultrasonic transducer that runs along a partial length of the acoustic receive array, thereby being side fed.

26. The ultrasonic sensor according to claim 20,
wherein the ultrasonic sensor further comprises a tank having side walls comprising a first opening and an second opening, each of the first opening and the second opening between an inside and an outside of the tank;
wherein the feed strip passes through the first opening with the send ultrasonic transducer located outside the tank and the substrate located inside the tank; and
wherein the another feed strip passes through the second opening with the receive ultrasonic transducer located outside the tank and the substrate located inside the tank.

27. The ultrasonic sensor according to claim 18, wherein the feed strip has a length between the bend and the ultrasonic transducer that runs along an entire length of the acoustic array, thereby being top fed.

28. The ultrasonic sensor according to claim 18, wherein the feed strip has a length between the bend and the ultrasonic transducer that runs along a partial length of the acoustic array, thereby being side fed.

29. The ultrasonic sensor according to claim 28, further comprising a tank having side walls with an opening between an inside and an outside of the tank, the feed strip passing through the opening with the ultrasonic transducer located outside the tank and the substrate located inside the tank.

30. The ultrasonic sensor according to claim 28, wherein the feed strip has a bend of approximately 90 degree right angle to pass through the first opening in the tank; and wherein the other feed strip also has a bend of approximately 90 degree right angle to pass through the first opening in the tank.

* * * * *